United States Patent [19]

Livia et al.

[11] 4,403,688
[45] Sep. 13, 1983

[54] TUBE OR BAR STOCK FEED SYSTEM

[75] Inventors: Michael R. Livia, Brooklyn; William S. Gould, Suffern; Peter J. Suhr, Westbury, all of N.Y.

[73] Assignee: Magnetic Analysis Corporation, Mt. Vernon, N.Y.

[21] Appl. No.: 260,980

[22] Filed: May 6, 1981

[51] Int. Cl.³ .............................................. B65G 13/02
[52] U.S. Cl. .................................................. 198/785
[58] Field of Search ...................... 198/782, 785, 624; 29/123, 125, 130; 474/8, 23, 39, 40, 41, 42

[56] References Cited

U.S. PATENT DOCUMENTS

| | | |
|---|---|---|
| 2,860,766 | 11/1958 | Welter . |
| 2,871,011 | 1/1959 | Hercik . |
| 2,907,597 | 10/1959 | Williams . |
| 3,371,770 | 3/1968 | Graham et al. ............... 198/624 |
| 3,687,260 | 8/1972 | Willows ........................ 198/624 |
| 4,037,769 | 7/1977 | Meyers . |
| 4,314,629 | 2/1982 | Shilander et al. ............. 198/789 |

FOREIGN PATENT DOCUMENTS 1124350 8/1968 United Kingdom .

*Primary Examiner*—Joseph E. Valenza
*Assistant Examiner*—Jonathan D. Holmes
*Attorney, Agent, or Firm*—Pennie & Edmonds

[57] ABSTRACT

A system for transporting tube or bar stock along its horizontal axis comprising conveyor sections and a drive section each section containing a series of rotating drive assemblies. The drive assemblies contain a pair of frusto-conical rollers upon which the tube or bar stock rides. These rollers engage threads of opposite hands disposed on opposing portions of a driven shaft with respect to the axis of transport. Means for rotationally connecting and disconnecting the shaft and rollers such as locking pins or clutches are provided. Means for preventing the rotation of the rollers such as disc brake assemblies or stop bars which contact radially protruding members rotationally connected to the rollers are provided. When the rollers and shafts are rotationally connected and free to rotate, the work piece is transported. When they are disconnected and rotation of the rollers prevented the rollers on all the drive assemblies move synchronously toward or away from one another depending on the direction of rotation of a reversible drive means. The same drive means is used for both transport and roller adjustment.

5 Claims, 19 Drawing Figures

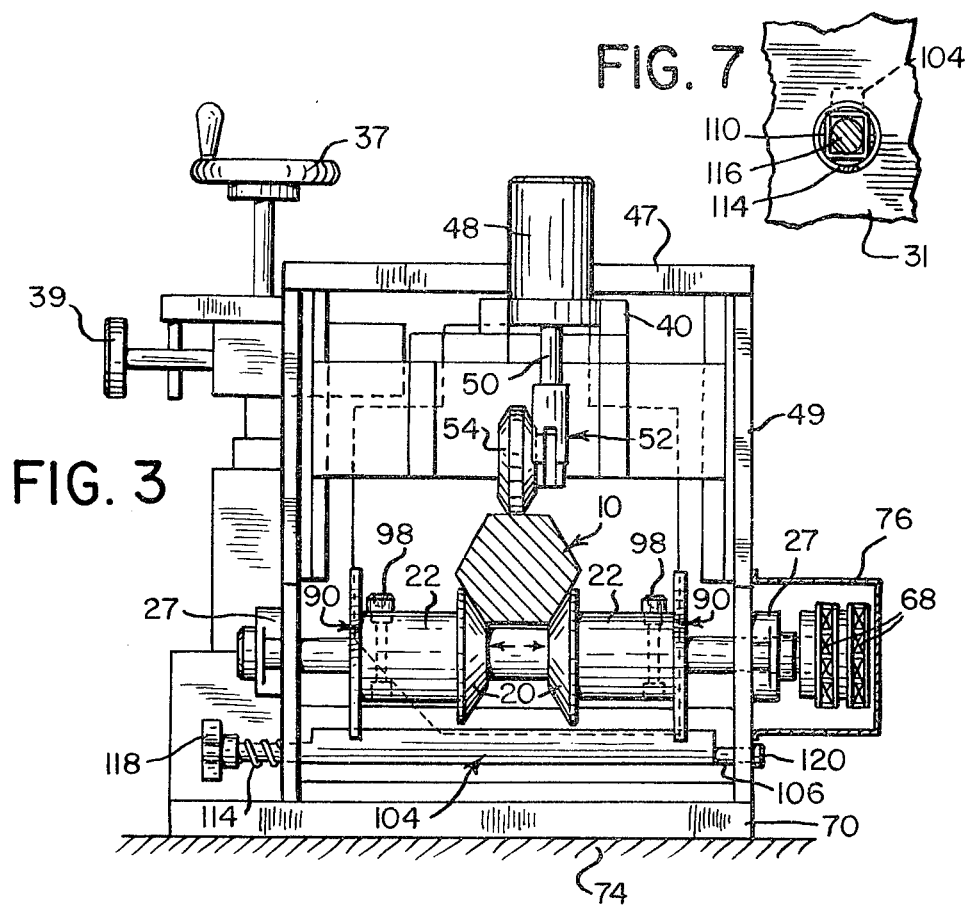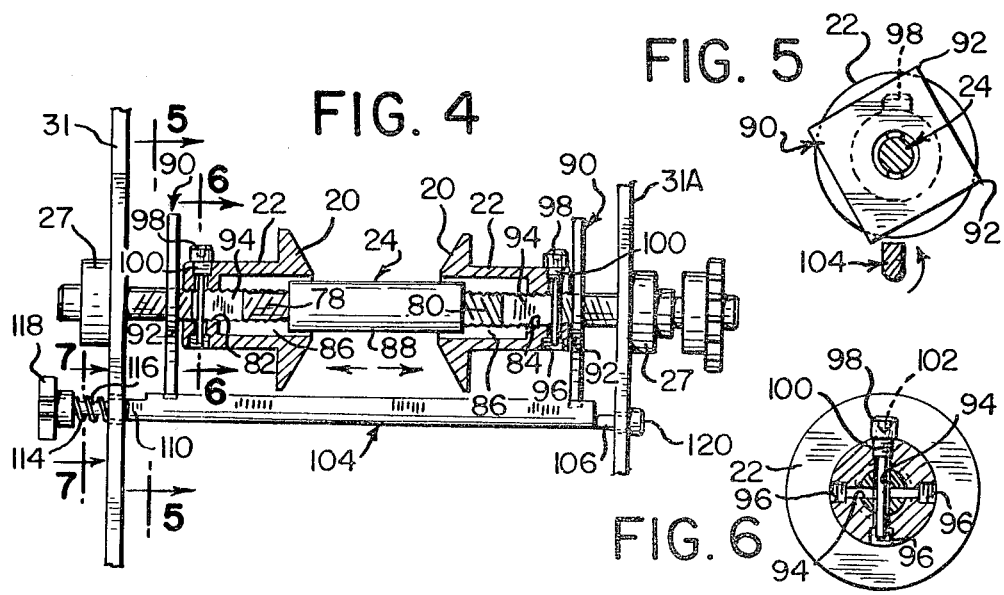

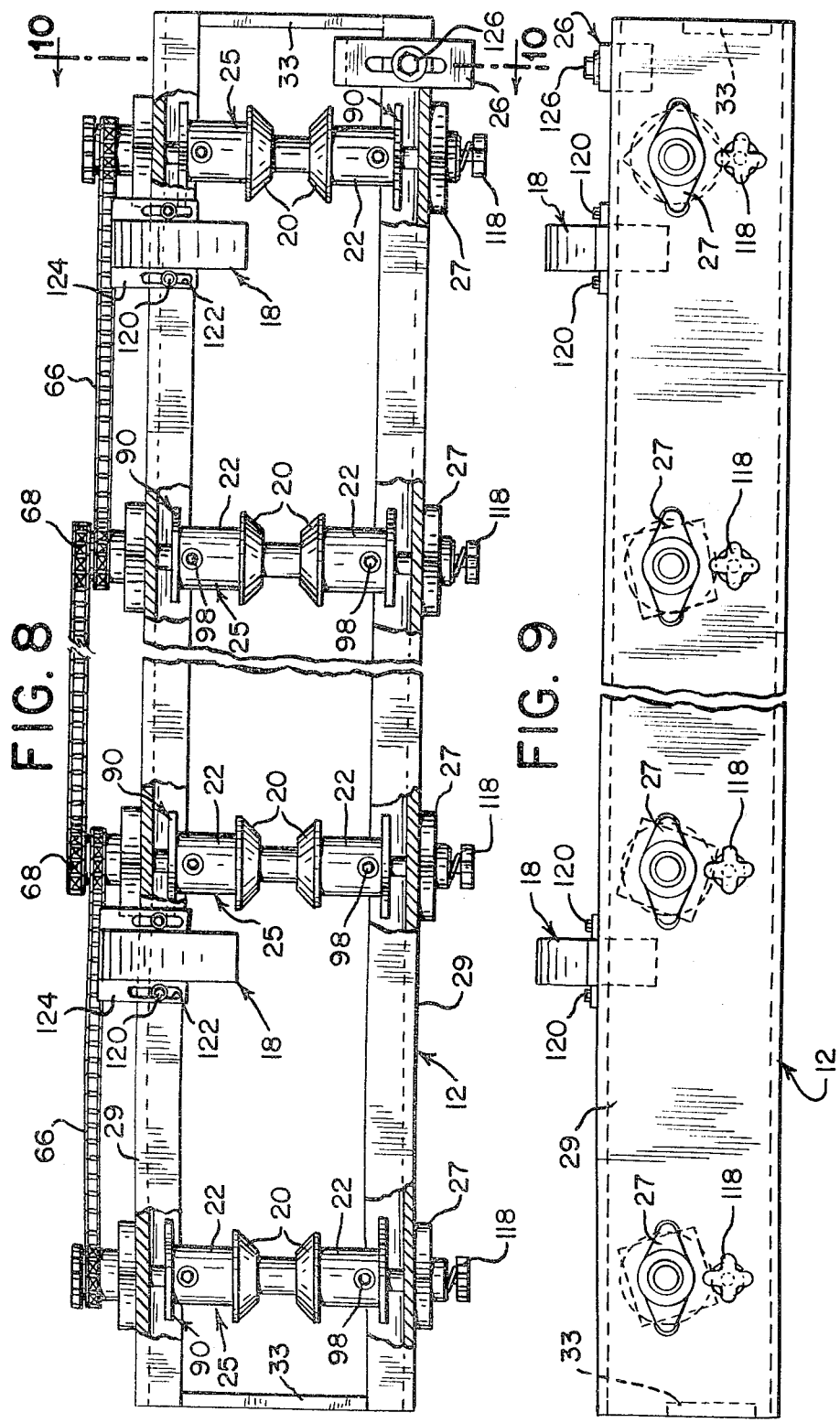

TUBE OR BAR STOCK FEED SYSTEM

TECHNICAL FIELD

This invention relates to apparatus used for transporting tube or bar stock. In particular it relates to apparatus used for transporting such material to and through an area where successive longitudinal portions of the material are inspected as it moves through such area in a direction along its longitudinal axis.

BACKGROUND ART

Tube or bar stock feed systems which convey such material in its longitudinal direction have been used in the material handling field and in the field of nondestructive testing. A rather complex roller assembly used in a roller conveyor which can effect longitudinal displacements of elongate elements of various cross-sectional shapes and dimensions is illustrated in U.S. Pat. No. 2,860,766 to Welter. A more common but less versatile form of roller assembly is disclosed in British Pat. No. 1,124,350 to Busche et al. It comprises a pair of coaxial frusto-conical rollers which form a split roller assembly. While a series of such rollers, especially when mounted on a shaft which is rotationally driven, may form a conveyor, this conveyor may not be useful for applications in which it is desired that tube or bar stock of various cross sectional shapes and sizes be maintained on a constant center in two mutually perpendicular directions which are perpendicular to the direction of transport of the material. Where the adjustment of roller position with respect to a center has been provided in the prior art each roller assembly would have to be individually adjusted. This made alignment of a conveyor which comprises a series of roller or drive assemblies a tedious, difficult and time consuming process requiring skill or special techniques. The adjustment process has generally been carried out manually on each roller assembly rather than automatically.

DISCLOSURE OF THE INVENTION

The present invention comprises an apparatus for transporting tube or bar stock, also referred to herein as a work piece, in a direction along its longitudinal axis. A series of drive assemblies which are aligned perpendicularly to the direction of transport and generally parallel to one another convey the material. These drive assemblies include roller assemblies made up of two coaxial frusto-conical rollers which surround a shaft and engage threaded portions of that shaft. These threaded portions are disposed on opposing portions of the shaft with respect to the longitudinal axis of the work piece and are generally symmetrically disposed with respect to that axis. Inclined surfaces of the frusto-conical rollers contact the work piece. The rollers may be rotationally connected or disconnected from the shaft. A reversible drive means, comprising a motor and chain and sprocket system rotates the shaft of each drive assembly in synchronism. When the rollers and shafts are rotationally connected, the tube or bar stock is transported along the apparatus. This constitutes the transport mode. When the rollers and shafts are rotationally disconnected, a means for preventing the rotation of the rollers is engaged. The rollers synchronously travel toward one another on the threaded portions of the shafts when the motor is rotated in one direction and synchronously travel away from one another when the motor is rotated in the opposite direction. Adjustments of the distance between the rollers in this fashion permits bar or tube stock to be fed on a constant center with respect to the two mutually perpendicular directions which are perpendicular to the direction of feed over a wide range of sizes and shapes. The spacing between all roller pairs is simultaneously adjusted. A single drive means or motor is used for both driving and for roller adjustment.

In one embodiment of the invention an adjustment mode may be selected by manually removing pins which rotationally connect the roller and shafts. A member which extends radially from the rollers to contact a stop bar that can be moved into position to prevent rotation of the rollers is used in this embodiment. Where automatic selection of an adjustment mode is desired the shafts and rollers may be rotationally connected and disconnected by means of housings configured to permit relative motion between the rollers and the housings in the direction of the shafts. These housings surround the shafts and rotationally engage the rollers and a portion of an electrically operated clutch associated with each housing. The clutch is configured to rotationally connect and disconnect the shaft and housing. Typically the rollers and housings are rotationally engaged by means of a spline. Each housing may be configured with a disc assembly to which it is rotationally connected. The disc assembly includes a disc which is perpendicular to the driven shaft. A pressure actuated caliper assembly is disposed to engage the disc and arrest the rotation of the disc when it is actuated. At these times, the clutches are disengaged and the spacing between the rollers may be adjusted by driving the shafts.

While this apparatus is useful for basic transport, the work piece may slip with respect to the rotating rollers and have its motion arrested if it encounters substantial mechanical resistance. One or more pinch wheel assemblies, which includes a pinch wheel that engages the work piece and urges it into firm contact with the inclined surfaces of the rollers, may also be provided. Typically the pinch wheel is urged towards the work piece by the action of a pressure operated cylinder. The pressure supplied to the cylinder may be controlled in response to the output of a photoelectric sensor which is disposed to receive a beam of light which is blocked by the presence of the work piece.

Generally, a complete tube or bar stock feed and drive system comprises an apparatus according to the invention without a pinch roll assembly but including input ramps which allow the work to be automatically placed onto the apparatus. When the work leaves this first conveyor component of the system, it may be transported over one or more additional conveyors of the same kind but without the input feed ramps. Alternatively, the work may be conveyed into a drive section which includes a pinch roll before and after a region in which testing of the work piece is accomplished. Very often it is this testing which produces resistance to the motion of the work piece requiring that the pinch rolls be used. After inspection, the work piece may continue on one or more conveyor sections, finally ending up on a conveyor section with a stop plate which arrests further motion of the work. This section may have rollers which are driven only for adjustment purposes. An automatic device of a type well known in the art may throw the work off this section and onto another apparatus which transports the work to a storage area.

BRIEF DESCRIPTION OF THE DRAWINGS

Further objects and advantages of the invention may readily be ascertained by reference to the following description and appended drawings.

FIG. 3 is a view taken along line 3—3 of FIG. 2 showing the work piece in cross section.

FIG. 4 is a partial cross sectional view showing details of a portion of FIG. 3.

FIG. 5 is a cross sectional view taken along line 5—5 of FIG. 4.

FIG. 6 is a cross sectional view taken along line 6—6 of FIG. 4.

FIG. 7 is a cross sectional view taken along line 7—7 of FIG. 4.

FIG. 8 is a plan view of a conveyor built according to the invention.

FIG. 9 is a front elevational view of the conveyor of FIG. 8.

DETAILED DESCRIPTION OF THE INVENTION

Figure 1:
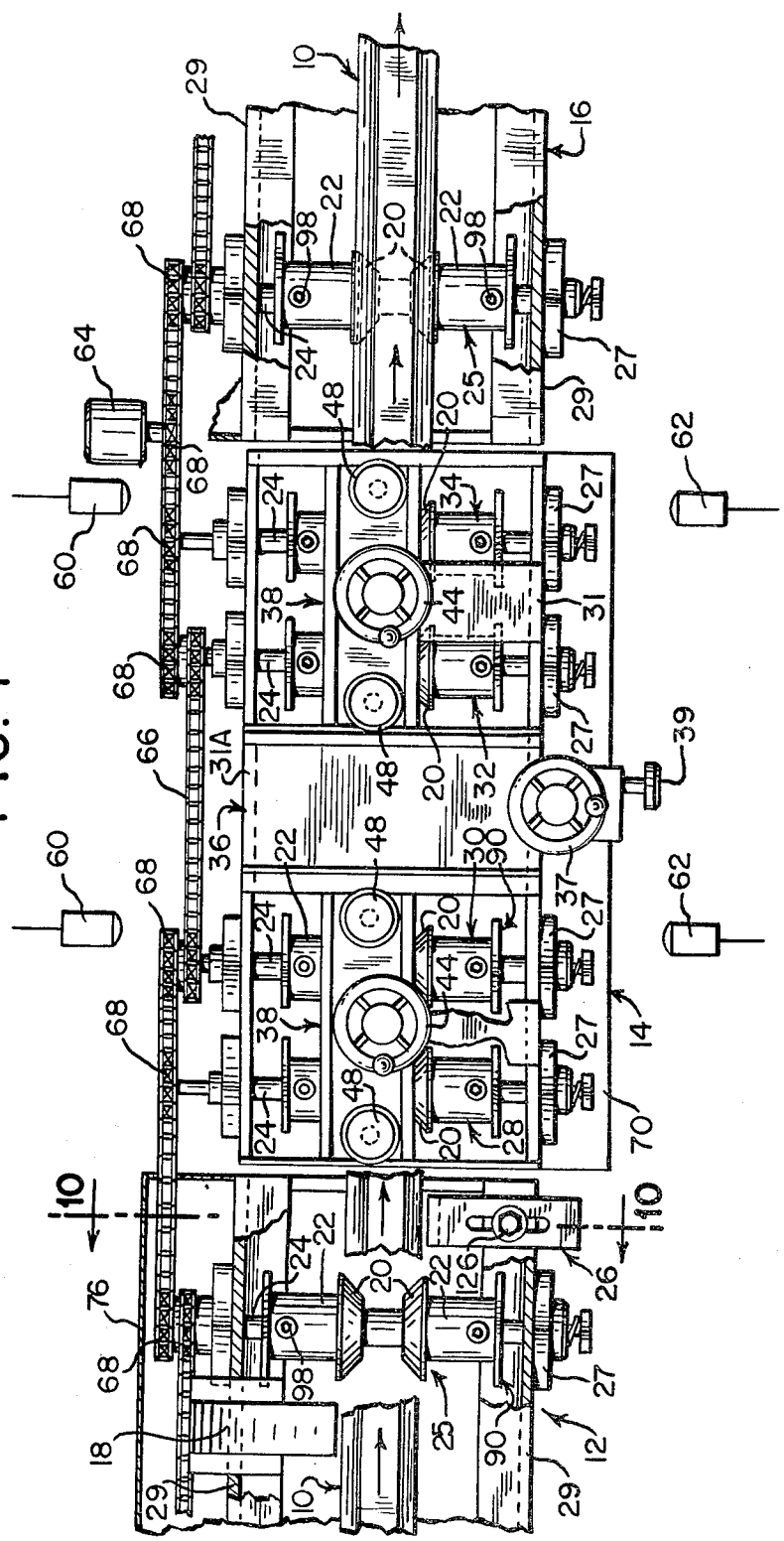
FIG. 1 is a plan view of a system which includes a conveyor apparatus, a central drive portion with pinch rollers and a conveyor assembly for transporting the work piece after it has been transported through the central drive assembly.

Referring to FIG. 1, a work piece 10 which may be hexagonal in cross section is transported on a conveyor section 12, a drive section 14 and a second conveyor section 16 which are constructed according to the invention. An adjustable feed ramp 18, which will be more fully described below, is one of two such ramps on conveyor section 12 which are useful for assuring that the work piece 10 is properly deposited on the conveyor to engage the inclined surface 20 of frusto-conical rollers 22, only one pair of which are illustrated for the conveyor assembly 12. These rollers surround driven shafts 24 and together with the pair of frusto-conical rollers 22 comprise a roller assembly 25 with a structure which is used throughout the conveyor sections and the drive section as described below. Bearings 27 of a type well-known in the art, are used to rotationally support shafts 24 to side members 29 of conveyor sections 12 and 16 and side members 31 and 31A of drive section 14.

Conveyor 12 also includes a stop plate 26, which could be used to arrest the motion of a work piece 10 if conveyor 12 were the final conveyor in a series. Stop plate 26, however, is shown in a withdrawn position where it will not interfere with the motion of work piece 10 which will travel from conveyor section 12 to drive section 14.

Figure 2:
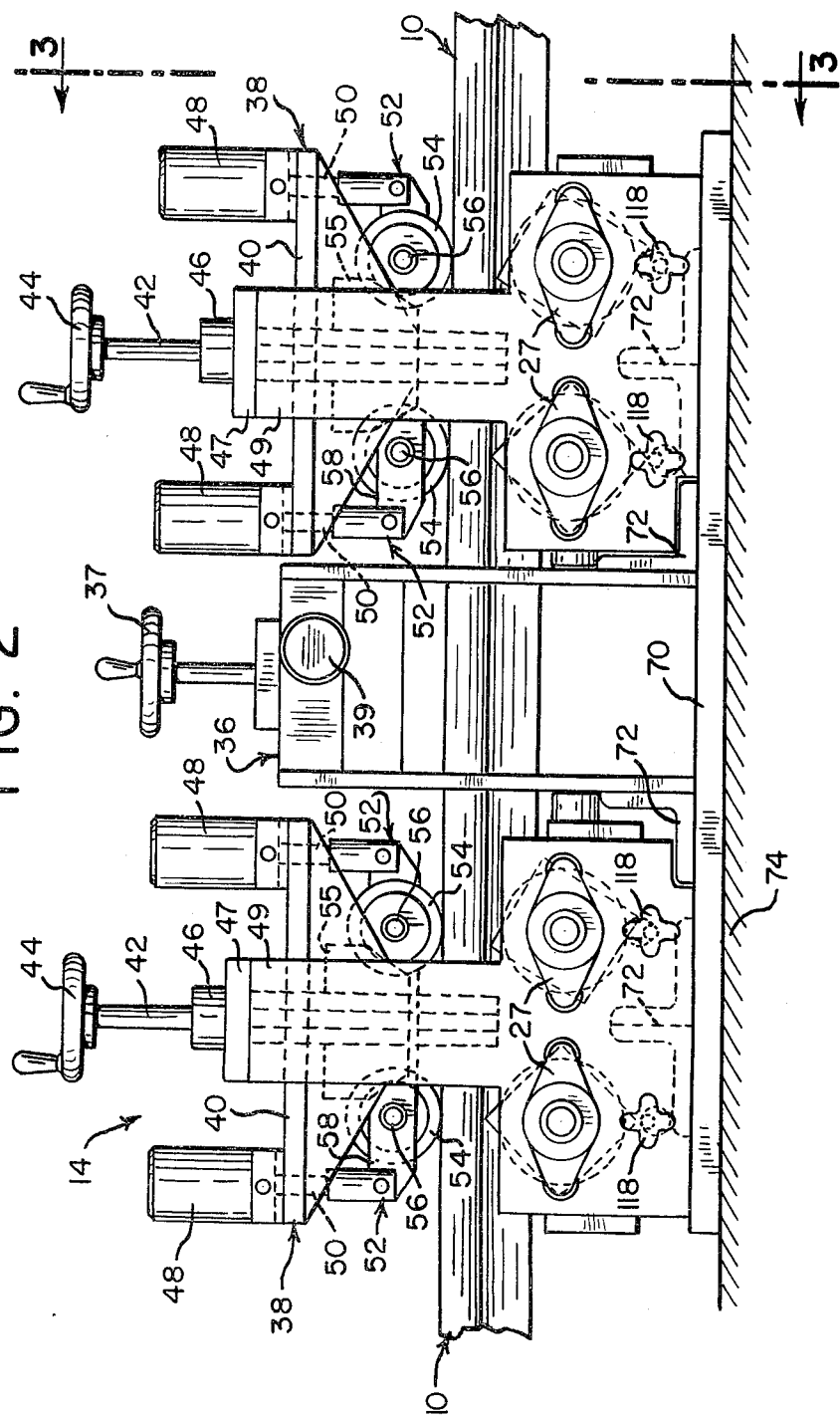
FIG. 2 is a front elevation view of the central drive section shown in FIG. 1.

Drive section 14, also shown in front elevational view in FIG. 2, includes two input drive assemblies 28 and 30 and two output drive assemblies 32 and 34 between which an inspection or work station 36 is located. Station 36 may include the components of some apparatus performing some type of work or operation on the work piece. Typically, it contains the sensing head of an apparatus for magnetically inspecting the work piece for flaws or defects in its structure when the work piece 10 is a ferromagnetic material but other operations can conceivably be performed at station 36. The components for performing such operations may be mounted on a stage apparatus, not shown, within station 36, which may provide some limited adjustment of the position of the components within station 36 with respect to the work piece 10, or with respect to one another. Rotation of handwheels 37 and 39 controls such positioning. Because the operations performed on work piece 10 may cause some resistance to the transport of work piece 10 through station 36, it is desirable that the work piece 10 be caused to make firm mechanical contact with the inclined surfaces 20 of the pairs of frusto-conical rollers 22 that are associated with drive assemblies 28, 30, 32 and 34 which rotate to cause the work to be transported. As may be more fully appreciated by reference to FIGS. 2 and 3, work piece 10 is urged into firm mechanical contact with these inclined surfaces by the action of pinch wheel assemblies 38.

Each pinch wheel assembly 38 comprises a stage 40 which is a horizontally disposed rectangular plate with a hole through which it is threaded to a portion of height adjustment shaft 42. Shaft 42 is manually rotated by means of handwheel 44. As a consequence of shaft 42 being permitted to rotate but not translate along its longitudinal axis in bearing 46, plate 40 moves vertically up or down in response to either clockwise or counter-clockwise rotation of handwheel 44. Bearing 46 is mounted on horizontal plate 47 which is supported by vertical extension 49 or side wall 31.

Mounted upon plate 40 are pressure actuated cylinders 48. These cylinders contain pistons, not shown, to which piston rods 50 are connected. Piston rods 50 are connected to pinch roller assemblies 52 which include pinch rollers 54. Rollers 54 are free to rotate about short axles 56 protruding from member 58, a component of pinch assembly 52.

In operation after the spacing between the frusto-conical rollers has been adjusted, as described below, a work piece is placed in drive section 14 and without pressure being applied to cylinders 48, hand wheel 44 is manually rotated to adjust the height of pinch wheels 54 until they are approximately one quarter inch above work piece 10. The application of pressure to cylinders 48 then serves to drive pinch wheels 54 into contact with the work piece urging it into contact with the inclined surfaces 20 of the frusto-conical rollers. Where thin walled tubing is being transported, the pressure applied to cylinders 48 should be adjusted so that the tube is not deformed by the pinch wheels.

In practice it is desirable that rollers 54 be positioned so as not to contact the leading ends of a work piece as the work piece enters drive section 14. It is preferable that this leading edge have traveled past input drive assemblies 28 and 30 before pressure is applied to the cylinder 48 with which these assemblies are associated. It is thus necessary to provide a means for detecting the position of the leading edge of the work piece or at least the presence of the work piece at a point past the input drive assemblies 28 and 30.

A convenient way of detecting the presence of the work piece is with photoelectric sensors 60 which are disposed to receive beams of light from light sources 62 that are blocked by the presence of the work piece. Appropriate locations for these devices are shown in FIG. 1. Sensors 60 produce an output which through means such as an electrically activated valve, not shown, controls the pressure supplied to cylinders 48. Thus with appropriate use of electronic logic and possibly delay circuits, as is well known in the art, pinch wheels 54 will not be driven downward by the action of cylinders 48 unless a work piece 10 is present. It has been assumed in the discussion above that both cylinders 48 mounted on one of the stages 40 would be simultaneously pressure actuated. In this case a connecting member 55 can be used to mechanically connect members 58 of pinch assemblies 52. If it is desired to have the pinch rollers 54 come down separately in sequence, member 55 would not be installed, and additional photoelectric detectors and light sources could be used. The above discussion, which applies to the position of pinch wheels 54 associated with input roller assemblies 28 and 30, also applies to the positioning of pinch wheels 54 associated with output roller assemblies 32 and 34. When work piece 10 no longer blocks the light beams pressure to cylinders 48 is released. Pinch wheels 54 move upward until another workpiece blocks the beams.

Referring to FIG. 1, all of the drive assemblies of conveyor sections 12 and 16 and of drive section 14 are synchronously driven by a reversible drive means, preferably a reversible motor 64, through a drive system comprised of a series of chains 66 and sprocket assemblies 68. Synchronous drive is required if the spacing between rollers 22 is to be synchronously adjusted on all drive assemblies. Referring to FIG. 2, it is understood that the major assemblies are mounted to a base 70 as shown by securing means such as angle brackets 72. Base 70 is firmly secured to an immovable platform 74 upon which motor 64 and conveyor sections 12 and 16 may also be mounted.

Referring to FIG. 3, a chain guard 76 which may be desirable for safety reasons is shown. For simplicity it has been shown in FIG. 1 as being associated with conveyor section 12 rather than drive section 14. FIG. 3 also illustrates the details of construction of the drive assemblies used in the apparatus of the invention. This construction may be more fully appreciated by referring to FIG. 4.

Each roller assembly, one of which is illustrated in cross section in FIG. 4, is constructed around shaft 24. Shaft 24 has threaded portions 78 and 80 disposed on opposing portions of shaft 24 with respect to the longitudinal axis of work piece 10. Generally they are symmetrically disposed with respect to this axis. Rollers 22 have internal threads 82 and 84 engaging threads 78 and 80. Rollers 22 are also configured with cylindrical cavities 86 which are of slightly larger diameter than portion 88 of shaft 24. Portion 88 may be an integral portion of shaft 24, if shaft 24 is of single piece construction or may be a bushing which fits snugly over shaft 24. One advantage of its being a bushing is that it can be replaced should it become worn or defective, without the need of replacing shaft 24 which would entail considerably more expense because of its machining costs. Associated with each roller 22, is member 90 which is rotationally connected to roller 22. Shaft 24 extends through clearance holes in members 90 as can be seen by referring to FIG. 5. Member 90 may be a square plate or any other regular geometric shape such as a hexagon or octagon with regularly spaced portions 92 disposed radially from shaft 24 at a distance greater than the largest radius of roller 22.

Opposing portions of shaft 24 are configured with at least one slot 94 extending diametrically through and axially along shaft 24 for each roller. Each roller contains at least one opening 96 which may be rotationally aligned with slot 94, by rotation of roller 22 with respect to shaft 24. A removable pin 98 is configured to extend through an opening 96, slot 94 and preferably when sufficiently long through diametrically opposite opening 96. FIG. 6 shows roller 22 as having two pair of openings 96 but one pair is acceptable. Means such as threads 100 are provided for securing pins 98 in position when they extend through openings 96 and slot 94.

When work pieces of different sizes or in some cases of different shapes are to be transported through the system, it is generally necessary to adjust the spacing between rollers 22 which in FIG. 4 are shown at their maximum separation. This maximum separation is limited by the length of slots 94. The length of section 88 of shaft 24 should be slightly greater than the combined lengths of slots 94 to assure that there is no gap between rollers 22 and portion 88 when the rollers are adjusted to maximum separation.

The spacing between rollers 22 is adjusted by rotationally disconnecting shaft 24 and rollers 22 and by preventing rotation of the rollers 22. When these two conditions obtain the rollers will move either toward or away from one another when shaft 24 is rotated as the rollers travel on threaded portions 78 and 80.

To rotationally disconnect the rollers 22 and shaft 24 it is merely necessary to remove pins 98. This is generally accomplished by inserting an Allen wrench into the heads of these pins which are provided with recesses 102 to accept the wrench.

Rotation of rollers 22 is prevented by means of stop bar 104 which can be in either of two positions: a first position which allows rotation of rollers 22 and a second which prevents rotation of rollers 22 because stop bar 104 engages portions 92 of radially extending members 90. In FIG. 5 stop bar 24 is in its downwardly extending position thus permitting free rotation of the rollers. FIG. 4 shows stop bar 104 in its inwardly extending position where it prevents rotation of rollers 22. Stop bar 104 has a cylindrical extension 106 extending through a circular hole of side wall 31A. A square extension 110 extends to a square opening of side wall 31. Spring 114 surrounding a further circular extension 116 of stop bar 104 is compressed between side wall 31 and knob 118. Spring 114 by virtue of force exerted upon knob 118 forces stop bar 104 to move to the left in FIG. 4. Such motion is limited by hub 120 which prevents further motion upon contacting wall 31A.

When stop bar 104 is to be moved from one of the positions discussed above to the other, knob 118 must be manually pushed towards side wall 31 thus compressing spring 114. Circular extension 116 is thus moved into the square opening of side wall 31. Square extension 110 which closely fits into the square opening of side wall 31, as may be more fully appreciated by viewing FIG. 7, is thus moved out of this opening. Knob 118 can now be rotated as there is no physical restraint on the rotation of circular extension 116 when it is within the opening of side wall 31. Knob 118 may be rotated until stop bar 104 is in its upwardly extending position to permit adjustment of the spacing between the rollers. Such adjustment is accomplished by using drive motor 64 to rotate all of the drive shafts 24 synchronously. It is recognized that drive motor 64 may be operated advantageously at a slower rotational rate when adjustment of roller spacing is being made, than its usual rate of rotation when the apparatus is being used to transport material.

When adjustment of the spacing of rollers 22 is substantially complete it is only necessary to rotate shaft 24 or alternatively rollers 22 until an opening 96 lines up with slot 94 to permit insertion of pin 98. To provide for more precise control of spacing, two mutually perpendicular slots 94 are provided in each threaded portion of shaft 24 as may be appreciated from FIG. 6. Thus it is possible to insert pins 98 at every one quarter turn of roller 22 with respect to shaft 24. Providing additional openings in rollers 22 would provide for even finer adjustment.

It will be apparent that in the initial assembly of the apparatus it is necessary that all rollers 22 be carefully adjusted so that the work piece is maintained on a common center by all such rollers. As indicated above, this procedure may be a bit difficult and time consuming but in the apparatus of this invention once having been accomplished at assembly, roller spacing can be thereafter adjusted, as outlined above, simply and easily.

Prior to using the apparatus to transport material it is of course necessary to reinsert pins 98 and lower stop bar 104 so as not to interfere with the rotation of member 90 and therefore rollers 22.

Figure 10:
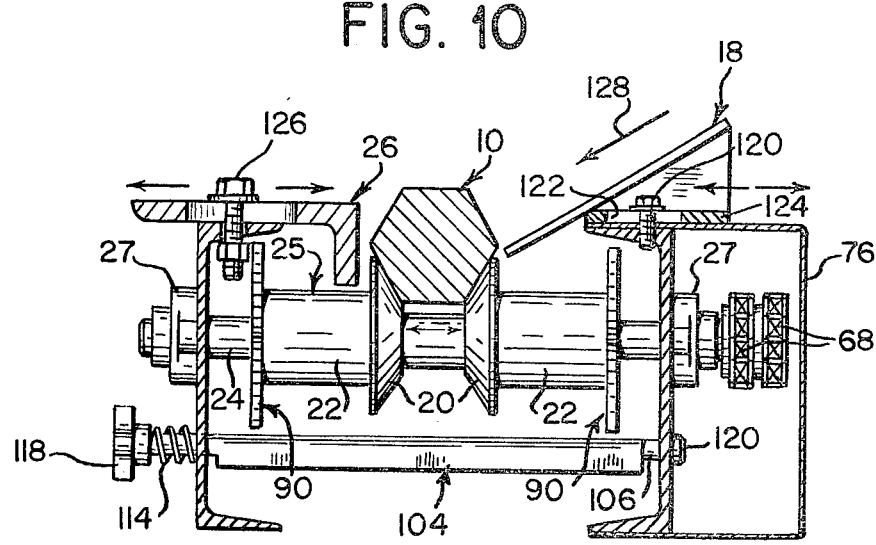
FIG. 10 is a cross sectional view taken along line 10—10 of FIG. 8, shown with a work piece in place.

FIGS. 8, 9 and 10 illustrate conveyor section 12 of which only the extreme right hand portion is shown in FIG. 1. It comprises four synchronously driven drive assemblies 25 but it is understood that additional drive assemblies may be used as required for a longer length conveyor. Members 33, not of sufficient height to interfere with the transport of work piece 10, form a rectangular frame structure with side walls 29. A pair of adjustable feed ramps 18 which are used to deposit material onto the conveyor are shown. As may be more fully appreciated with reference to FIG. 10 the position of the adjustable feed ramps is changed by loosening machine screws 120 which protrude through slots 122 of base member 124 of ramp 18. It may be adjusted towards or away from the axis of transport depending upon the spacing between rollers 22 so that work piece 10 may slide down the ramp as indicated by arrow 128 and be properly deposited upon the rollers 22. The position of stop bar 26 may be adjusted in a similar manner by loosening machine screw 126 and tightening it when it is properly positioned. If it is positioned to stop the transport of work piece 10 because it is the last in a series of conveyors, adjustable ramps 18 need not be present.

Stop bar 104 is shown in its downward position where it does not interfere with rotation of radially extending members of 90. As may be appreciated by reference to FIG. 9 it is necessary when making adjustments in spacing of the rollers to properly position stop bar 104 associated with each roller by the use of each of the knobs 118 and to remove pins 28 from every roller assembly. While this is not a very time consuming process, the alternate embodiment of the invention illustrated in FIG. 11 permits automatic selection of an adjustment mode.

Figure 11:
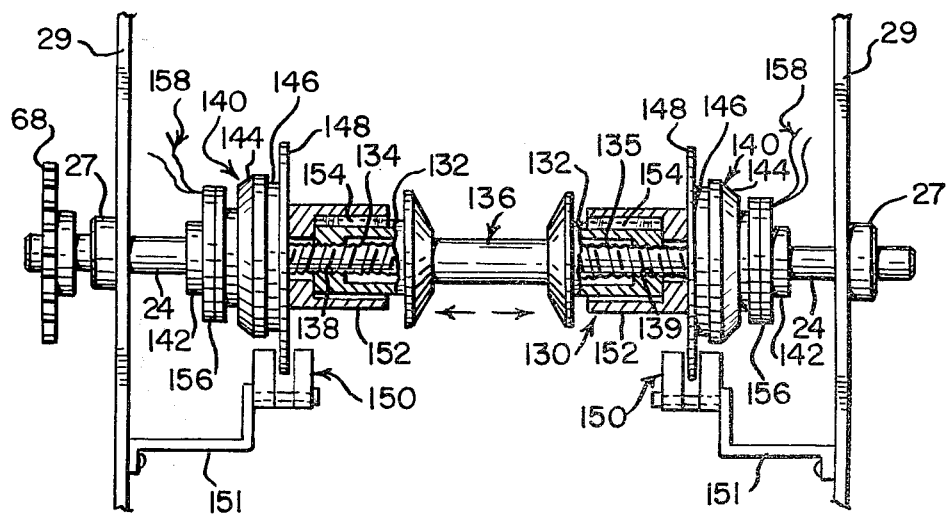
FIG. 11 is similar to FIG. 4, but illustrates an alternate embodiment of the drive assemblies used in the invention which permits selection of a mode in which synchronous and automatic adjustment of the spacing between rollers may be accomplished.

Referring to FIG. 11, an automatically adjustable roller assembly 130 is illustrated. A pair of rollers 132 are disposed on threaded portions 134 and 135 of shaft 136. Threaded portions 134 and 135, of opposite hands, engage internal threads 138 and 139 respectively of rollers 132. Shaft 136 is rotationally driven in bearings 27 of side walls 29 by chain driven sprocket 68. Rotationally connected to shaft 136, disposed outwardly from the center of shaft 136 with respect to the rollers 132, are clutch assemblies 140. Outer portions 142 of clutch assemblies 140 are splined or keyed to shaft 136. Inner portions 144 of clutch assemblies 140 are rotationally connected to disc assemblies 146 with discs 148 which extend radially into pressure activated caliper assemblies 150 which are mounted to side wall 29 by means of brackets 151. Each disc assembly 146 is rotationally connected to a housing 152 which contains a cylindrical recess into which roller 132 can fit. Splines 154 rotationally engage rollers 132 and housings 152. Housings 152 surround shaft 136 which passes through an opening in housing 152 larger in diameter than shaft 136. Housings 152 are thus configured to permit relative motion between rollers 132 and housings 152 in the direction of shaft 136. Clutch assemblies 140 are electromagnetic clutches such as Model BEC-56B (or BEC-26EC for smaller applications) manufactured by Electroclutch Corp. of Union, N.J. Center portions 156 of clutch assemblies 140 do not rotate, being held in place by members, not shown, which are mechanically connected or fastened to some convenient fixed supports such as side walls 29. Wires 158 are provided to supply electrical power to activate clutch assemblies 140.

To adjust the spacing of rollers 132 of drive assembly 130 it is required that no electrical power be supplied to clutch 140. Outer portion 142 and inner portions 144 of clutch assemblies 140 are then not rotationally connected. At this time, pressure is supplied to calipers 150 preferably through hydraulic lines not shown causing brake pads, not shown, to firmly contact the sides of discs 148 thus preventing rotation of disc assemblies 146 and housings 152 as well as clutch inner sections 144.

The application of rotational drive to shaft 136 under these conditions causes rollers 132 to translate towards one another on threads 134 when shaft 136 is rotated in a first direction and away from one another when shaft 136 is rotated in the opposite direction. This results from the inability of rollers 132 to rotate when housing 152 is prevented from rotating by the action of caliper 150 on disc 148.

When rollers 132 have been adjusted to the proper spacing, rotational drive of shafts 136 is terminated.

To use drive assembly 130 for transport of a work piece, it is merely necessary that pressure supplied to calipers 150 be released and clutch assemblies 140 be activated by the application of electrical power. Housings 152 and shafts 136 are thus rotationally connected and discs 148 are free to rotate. Rollers 132 now rotate as a result of the rotation of housings 152 and the transmission of rotational force by splines 154.

Figure 12:
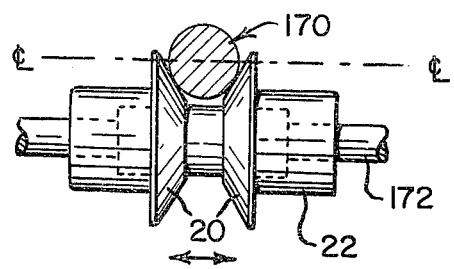
FIGS. 12 and 12A illustrate adjustment of the spacing between the rollers of the apparatus of the invention to keep a work piece of circular cross section on constant center.
Figure 12A:
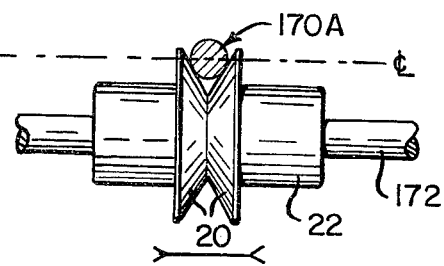

Referring to FIGS. 12 and 12A work pieces of circular cross section 170 and 170A but of different diameters are held on the same center lines in two mutually perpendicular directions which are both perpendicular to the direction of transport of the work piece by means of adjustment of the spacing between rollers. FIG. 12A shows the smallest diameter circular stock for which this can be accomplished. Smaller diameters, while on center horizontally, would fall below center in the vertical direction. It is recognized that there is always a size range limitation as to the degree of variation of size that is permissible before the bar stock can no longer be maintained on center when its diameter is increased. This is determined by the size of the rollers and the angle of inclination of the inclined surfaces with respect to the drive shaft assuming that the maximum distance between rollers is not the limitation. When the work piece is so large its bottom contacts the shaft center section the maximum size that can be maintained on center has been reached. In FIGS. 12 and 12A inclined surfaces 20 are of an angle of sixty degrees with respect to driven shaft 172.

Figure 13:
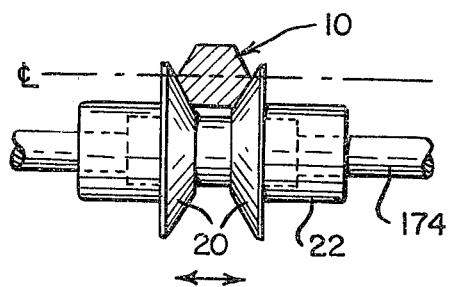
FIGS. 13 and 13A are similar to FIG. 11 but illustrate the manner in which a work piece of hexagonal cross section may be maintained on a constant center.
Figure 13A:
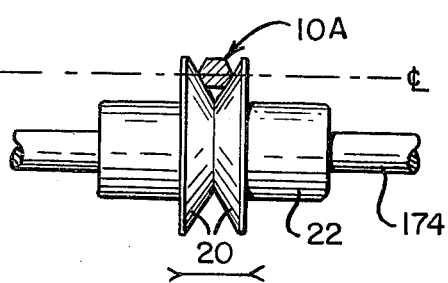

FIGS. 13 and 13A are similar to FIG. 12 but serve to illustrate the limitations when hexagonal work pieces 10 and 10A are being transported. The inclined surfaces of the rollers 22 are inclined at an angle of sixty degrees with respect to drive shaft 174. FIG. 13A shows the smallest hexagonal work piece 10A which may be transported for the roller size shown while being maintained on the same horizontal center line as the larger work piece 10A. As in FIG. 12, this occurs when the rollers physically contact one another after reduction of spacing between them.

Figure 14:
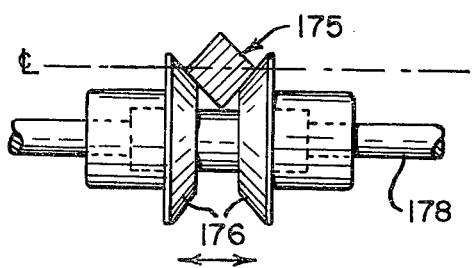
FIGS. 14 and 14A are also similar to FIG. 11 but illustrate the manner in which square work pieces of varying cross sectional dimensions may be maintained on a constant center.
Figure 14A:
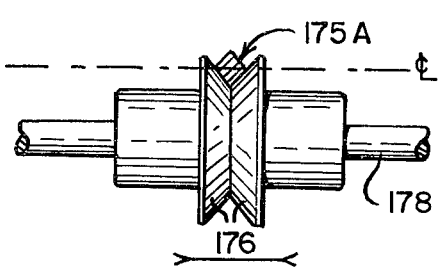

Referring to FIG. 14 the transport of two sizes of square cross section bar stock 175 and 175A is illustrated. The angle of inclination of the inclined surfaces 176 of the rollers is forty five degrees with respect to the shaft 178.

Figure 15:
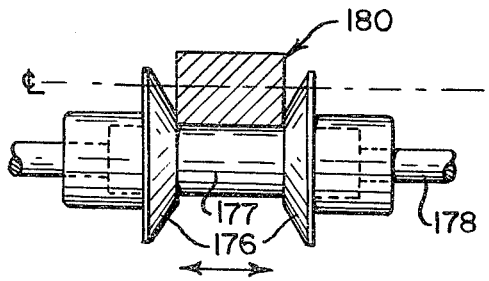
FIGS. 15 and 15A are similar to FIG. 11 but apply to work pieces of rectangular cross section which are of similar shape but of different cross sectional dimensions.
Figure 15A:
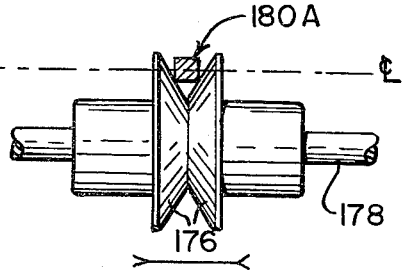

FIGS. 15 and 15A illustrate the difficulties of maintaining rectangular stock on constant center. The bars 180 and 180A picked for illustration in these figures must be placed upon the rollers in a different manner to be held on a constant center. It is recognized that an intermediate size rectangular bar of similar shape would not be maintained on the same center in the horizontal and vertical directions. An angle of inclination of forty five degrees for inclined surfaces 176 has been shown. For bar 180 resting on section 177 of shaft 178 this is not critical.

It will be understood by one skilled in the art that when any work piece with a cross section which comprises an equilateral geometric shape is to be transported it will be possible to maintain the work piece on constant centers in both the horizontal and vertical directions over a substantial range of sizes. While hexagonal and squarecross sections have been shown in FIGS. 13 and 14 it is recognized that bars of octagonal or pentagonal cross sections of varying sizes with equilateral sides could be transported merely by changing the angle of inclination of the rollers with respect to the driven shaft to be the supplement of the internal angle between sides.

While a given angle of inclination of the inclined surfaces of the rollers may be useful only for a limited number of geometric shapes or perhaps only one geometric shape the apparatus may readily be constructed so that replacement of all rollers may be effected. Thus rollers of another angle of inclination may be substituted if the cross sectional shape which must be driven through the apparatus is changed from time to time. Alignment of the rollers as mentioned above would be required at such times but need only be accomplished once. Bars or tubes of different size may then be transported conveniently as outlined above by adjustment of the spacing between the rollers.

It is recognized tht it may be useful to employ a slip clutch between motor 64 and the chain and sprocket drive system to prevent damage to the system should the rollers be driven to their extreme positions or should stop bar 104 be left in its upward position when pins 98 are not removed. A slip clutch may also be useful for preventing excess wear on the last or take off conveyor section because of friction with a work piece that has had its motion arrested by contacting stop bar 26. If it is used it should be disposed at a point in the system which results in all drive assemblies on this last conveyor section ceasing rotation simultaneously.

The components of this system should be designed and constructed of metal components of sufficient strength to withstand operating loads. The selection of materials and specific design details will be apparent to one skilled in the art, from the foregoing description and accompanying drawings as will be various other modifications of the invention, in addition to those shown and described herein.

We claim:

1. An apparatus for transporting tube or bar stock in a direction along its longitudinal axis comprising:
   (a) a series of drive assemblies aligned perpendicularly to said direction of transport, each drive assembly including:
      (i) a driven shaft;
      (ii) threaded portions of oppsite hands on said shaft disposed on opposing portions of said shaft with respect to said axis;
      (iii) a roller assembly of two coaxial frusto-conical rollers surrounding said shaft and engaging said threaded portions;
      (iv) an inclined surface on each of said frusto-conical rollers configured to contact said tube or bar stock;
      (v) means for rotationally connecting and disconnecting said rollers and said shaft including a housing configured to permit relative motion between said roller and said housing in the direction of said shaft, surrounding said driven shafts and rotationally engaging said rollers, and a series of electromagnetic clutches, one associated with each housing, said clutches configured to rotationally connect and disconnect said shaft and said housing;
   (b) reversible drive means for rotating the driven shaft of each drive assembly in synchronism in a first direction or a second direction to transport said tube or bar stock when said shaft and said roller assemblies of each drive assembly are rotationally connected, and
   (c) means for preventing the rotation of said rollers when said shaft is rotationally disconnected from said rollers whereby said rollers of each drive assembly synchronously travel toward one another on said threaded portions of opposite hands when said drive means is rotated in said first direction and synchronously travel away from one another when said drive means is rotated in said second direction.

2. The apparatus of claim 1 wherein the rollers and housing are rotationally engaged by means of a spline.

3. The apparatus of claim 1 wherein the electromagnetic clutches are simultaneously actuated and deactuated.

4. The apparatus of claim 1 wherein the means for preventing the rotation of said rollers comprises:

(a) a disc assembly rotationally connected to each said housing said disc assembly having a disc perpendicular to said driven shaft, and (b) pressure actuated caliper assemblies disposed to engage said discs and arrest the rotation of said disc when actuated.

5. The apparatus of claim 4 wherein the calipers are simultaneously actuated.

* * * * *